United States Patent Office 3,389,861
Patented June 25, 1968

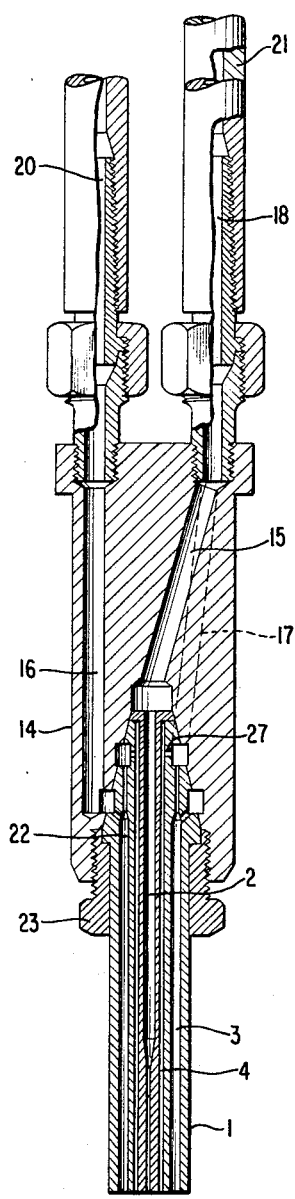

3,389,861
DEVICE FOR GAS CUTTING UTILIZING A SHIELD GAS
Minoru Nakanishi and Hidehiko Hayasaki, Tokyo, Japan, assignors to Kabushiki Kaisha Tanaka Seisakusho
Filed Mar. 21, 1966, Ser. No. 535,885
Claims priority, application Japan, Oct. 26, 1965, 40/65,303
1 Claim. (Cl. 239—422)

ABSTRACT OF THE DISCLOSURE

A device for gas cutting, utilizing a nozzle having a central cutting gas conduit, an intermediate concentric shield gas conduit and an outer concentric heating gas conduit. The incoming supply of shield gas to the nozzle is divided between the intermediate and outer conduit by means of a suitable porting arrangement within the nozzle structure.

Background of the invention (1) *Field of the invention.*—The present invention relates to a device for gas cutting and more particularly to a blow pipe and nozzle arrangement which provides a cutting oxygen gas stream surrounded by another oxygen (to be referred to as "shield gas stream" hereinafter) having a velocity lower than that of said cutting gas stream and which in turn is surrounded by a mixed gas stream for a preheating flame.

(2) *Prior art.*—A process of gas cutting comprises steps of heating a certain portion of the surface of a metal article to be treated by means of a high temperature preheating flame, such as an oxygen-acetylene flame, an oxygen-propane flame, petroleum gas flame, natural gas flame, etc. until the temperature of said portion of said metal article is raised to its ignition temperature, blowing a stream of highly refined oxygen to thus preheated portion to oxidize and burn said portion, and thus cutting said metal article at said portion, and it has been well known that the efficiency of said process of gas cutting is mainly determined by the purity of oxygen in the cutting oxygen stream. Accordingly, it is preferred to use highly purified oxygen in said process of gas cutting, and for example in an Industrial Standard it is stipulated that the purity of oxygen for such purposes should be at least 99.5%, and the purity of oxygen actually used in various industries at present is not less than 99.7% in most cases.

In actual cutting operations, however, during the period of time when the cutting oxygen gas stream travels from an ejecting nozzle of a blow pipe to the preheated portion of a metal article to be cut, said cutting oxygen stream must pass through an atmosphere of the preheating flame in the case of using a concentric nozzle, and hence certain amounts of impurities, such as the preheating gas and other impurities in the air, are dissolved in said cutting oxygen stream to reduce its purity, thereby the efficiency in the gas cutting process is reduced.

Prior art devices are known wherein the nozzle is provided with concentric passageways for the cutting oxygen, the shield gas, and the gas for the preheating flame. However, such devices derived the oxygen for the cutting stream and the shielding stream from the same source either through a common valving arrangement in the blow pipe or by means of connecting lead ports between the central cutting gas conduit and the intermediate shielding gas conduit within the nozzle structure. It is a common practice in the art to utilize the preheating flame in the absence of the cutting flame for the purpose of preheating the workpiece prior to the cutting thereof. In using the prior art devices mentioned above, when the cutting oxygen gas stream was shut off the shielding gas stream would also be automatically stopped and if the preheating flame was operative, the surface of the cutting gas nozzle would be damaged by the accumulation of heat from the preheating flame.

Summary of the invention

The principal object of the invention is to obviate said difficulties in conventional devices by providing a novel device for gas cutting, in which the cutting oxygen gas stream is surrounded by a protective shield gas stream to prevent the reduction in the purity of oxygen in the cutting stream, and to accelerate the oxidizing reaction in an efficient manner.

The present invention also provides a device for gas cutting in which a protective shield gas stream will be provided for the cutting nozzle when the preheating flame is operated in the absence of the cutting flame.

Brief description of the drawing

The single figure is a cross sectional view of a blow pipe and nozzle constructed according to the present invention.

Detailed description of the invention

The device shown in the drawings is comprised of a blow pipe 14 and a nozzle 1 connected together in operative relation by means of a nut 23 at one end thereof. Three conduits 15, 16 and 17 are provided within the body of the blow pipe 14 and are connected by means of seatable fittings to supply conduit 18, 20 and 21 respectively at the end of the blow pipe 14 opposite from the nozzle 1.

The nozzle 1 is formed with a central conduit 2 which is disposed in direct communication with the conduit 15 in the blow pipe 14. Surrounding the conduit 2 are two additional annular conduits 3 and 4 which are concentric with respect to the central conduit 2. The outermost conduit 3 is placed in communication wtih the conduit 16 in the blow pipe 14 by means of an annular chamber 30 and a plurality of ports 31 leading from the chamber 30 to the conduit 3.

The conduit 17 in the blow pipe 14 terminates in an annular chamber 32 which in turn is connected to the outer conduit 3 by means of a plurality of ports 33 and to the intermediate conduit 4 through a plurality of fine holes 27. The supply conduit 20 may be connected to a source of preheating fuel gas such as acetylene or the like. The supply conduit 18 may be connected to a source of high pressure highly purified oxygen and the conduit 21 may be connected to a source of low pressure oxygen.

In the operation of the device shown in the drawing a mixture of oxygen and preheating fuel gas is provided in the outer conduit 3 in the nozzle 1 and a stream of low pressure shielding gas (oxygen) is provided in the intermediate conduit 4 of the nozzle 1. The high pressure stream of oxygen is provided through the central conduit 2. As clearly seen in the drawings the shielding gas is obtained solely from the low pressure oxygen which is being supplied for mixture with the preheating fuel gas, and as such when the preheating flame is operating a stream of shield gas will always be present to protect the nozzle tip surrounding the central conduit 2 from heat damage should the glow of oxygen through the central conduit 2 be discontinued. When the cutting flame and preheating flame are operating simultaneously the stream of shielding gas will also be present to prevent a reduction in the purity of the oxygen in the cutting stream and thereby accelerate the oxidizing reaction in an efficient manner.

Obviously many modifications and variations of the present invention are possible in the light of the above teachings. It is therefore to be understood that within the scope of the appended claim, the invention may be practiced otherwise than as specifically described.

What we claim is:
1. A gas cutting torch comprising a blowpipe body (14) with separate passageways (15, 16, 17) therethrough, separate inlet (18, 20, 21) openings in the blowpipe body for cutting oxygen gas under high pressure, a preheating fuel gas, and a preheating oxygen gas under lower pressure than the cutting oxygen gas and higher pressure than the preheating fuel gas, respectively, the openings being in fluid communication with the separate passageways and the passageways terminating in concentric vertically spaced openings, a mixer tip (22) nozzle (1) having three concentric passageways (2, 3, 4) extending axially therethrough, the central passage for cutting oxygen, the intermediate passage for shielding oxygen, and the outer passage for a preheating flame mixed gas of preheating oxygen and preheating fuel gas, means (23) securing the mixer tip nozzle to the blowpipe body with the central passage cooperating with the termination opening of the blowpipe passageway leading to the inlet for cutting oxygen gas, the intermediate passage cooperating with the termination opening of the blowpipe passageway leading to the inlet for low pressure preheating oxygen, and the outer passage cooperating with the termination opening of the blowpipe pasageway for the preheating fuel gas, the improvements including a path of fluid communication including a plurality of fine holes (27) between the outer and intermediate concentric passages in the mixer tip nozzle so that the low pressure preheating oxygen is passed into both the intermediate and outer concentric passage in the mixer nozzle tip to be used for both shielding gas and an oxidizing gas for the preheating flame mixed gas

References Cited

UNITED STATES PATENTS

| | | | |
|---|---|---|---|
| 2,210,402 | 8/1940 | Gaines | 148— |
| 2,210,403 | 8/1940 | Skinner | 148— |
| 2,411,759 | 11/1946 | Seley | 148— |

HYLAND BIZOT, *Primary Examiner.*

DAVID L. RECK, *Examiner.*

W. W. STALLARD, *Assistant Examiner.*